(12) United States Patent
Blotenberg et al.

(10) Patent No.: US 8,977,518 B2
(45) Date of Patent: Mar. 10, 2015

(54) DEVICE AND METHOD FOR PERFORMING A FUNCTIONAL TEST ON A CONTROL ELEMENT OF A TURBO ENGINE

(75) Inventors: Wilfried Blotenberg, Dinslaken (DE); Ulrich Gebhardt, Schwelm (DE)

(73) Assignee: MAN Diesel & Turbo SE, Augsburg (DE)

( * ) Notice: Subject to any disclaimer, the term of this patent is extended or adjusted under 35 U.S.C. 154(b) by 1439 days.

(21) Appl. No.: 12/308,973

(22) PCT Filed: Jun. 27, 2007

(86) PCT No.: PCT/EP2007/005683
§ 371 (c)(1),
(2), (4) Date: Oct. 1, 2009

(87) PCT Pub. No.: WO2008/000459
PCT Pub. Date: Jan. 3, 2008

(65) Prior Publication Data
US 2011/0040526 A1    Feb. 17, 2011

(30) Foreign Application Priority Data

Jun. 28, 2006  (DE) .......................... 10 2006 030 108

(51) Int. Cl.
*G06F 11/30* (2006.01)
*G21C 17/00* (2006.01)
*F04D 27/00* (2006.01)
*F04D 27/02* (2006.01)

(52) U.S. Cl.
CPC .......... *F04D 27/001* (2013.01); *F04D 27/0292* (2013.01); *F05B 2220/40* (2013.01)
USPC ........................................................ 702/182

(58) Field of Classification Search
USPC ........................................................ 702/182
See application file for complete search history.

(56) References Cited

U.S. PATENT DOCUMENTS

| | | | |
|---|---|---|---|
| 4,512,185 A | 4/1985 | Ghrist, III | |
| 4,831,535 A * | 5/1989 | Blotenberg | ........................ 415/1 |
| 6,164,901 A * | 12/2000 | Blotenberg | ........................ 415/1 |
| 2002/0108436 A1 | 8/2002 | Albuaijan | |
| 2006/0067810 A1 * | 3/2006 | Molitor | ............................ 415/1 |

FOREIGN PATENT DOCUMENTS

| | | |
|---|---|---|
| GB | 2 418 708 | 9/2005 |
| JP | 59023003 | 2/1984 |
| JP | 60088803 | 5/1985 |
| JP | 63129105 | 6/1988 |
| JP | 10008914 | 1/1998 |

OTHER PUBLICATIONS

International Preliminary Report on Patentability issued in corresponding application No. PCT/EP2007/005683.
German translation of a Chinese Office action issued in corresponding application No. PCT/EP2007/005683.

* cited by examiner

*Primary Examiner* — John Breene
*Assistant Examiner* — Manuel Rivera Vargas
(74) *Attorney, Agent, or Firm* — Cozen O'Connor

(57) ABSTRACT

A turbomachine has a first process control element, a second process control element, and a test system for testing the first process control element. The first process control element and the second process control element influence the same process variable. To test the first process control element, the test system changes the process variable by means of the second process control element. This change in the process variable caused by the second process control element is compensated again by means of the first process control element.

22 Claims, 6 Drawing Sheets

DEVICE AND METHOD FOR PERFORMING A FUNCTIONAL TEST ON A CONTROL ELEMENT OF A TURBO ENGINE

PRIORITY CLAIM

This is a U.S. national stage of application No. PCT/EP2007/005683, filed on 27 Jun. 2007, which claims Priority to the German Application No.: 10 2006 030 108.0, filed: 28 Jun. 2006; the content of which is/are incorporated here by reference.

BACKGROUND OF THE INVENTION

1. Field of the Invention

The present invention is directed to a device and a method for conducting a function test on control members of a turbomachine and particularly for performing a partial stroke test on valves.

2. Description of the Prior Art

US 2006/67810 A and U.S. Pat. No. 4,512,185 disclose test systems for testing one of a plurality of control valves through which a work medium is supplied to a turbine in its entirety. When the control valve under test is closed, the corresponding proportion of work medium is supplied by the rest of the control valves so that turbine operation is not affected.

In many technical systems, certain control members or process control elements such as, e.g., valves, remain in an unchanged position for long operating periods. This is the case particularly for process control elements which are to be used only in emergencies or in failure situations. Because the process control elements are rarely actuated, partial or complete blockage may occur, for example, due to deposits, wear, or thermal deformation. When this process control element is a valve which is only opened in case of emergency, this valve which is defective due to blockage will remain unnoticed until actuated in an emergency.

An example of a protection system of this kind is a surge limit control valve in turbocompressors. The surge limit control valve protects against surge, as it is called. Surge occurs when the operating point of the turbocompressor enters the unstable region of the operating map due to reduced flow or because of a rise in the end pressure. Surge brings about a cyclical flow and reverse flow of the compressed gas. This results in strong vibrations, pressure shocks, and rapid rises in temperature in the turbocompressor. Possible consequences include damage to bearings, rotors or blades and related operating outages. The surge limit control valve must be checked regularly for proper functioning because it is seldom actuated as it is only used for emergencies.

In the prior art, this problem in valves is countered by the so-called partial stroke test. In this partial stroke test, the valve is actuated at regular timed intervals in such a way that it travels over a small portion of its lifting movement. The lifting movement of the valve is monitored and its functionality is tested in this way.

The disadvantage in the partial stroke test known from the prior art consists in that the actuation of the valve influences the operation of the entire process downstream of the turbomachine. For this reason, only a short stroke is traveled, or the testing time is reduced to a minimum in order to keep the influence on operation as slight as possible. Surge limit control valves are usually designed for approximately 200% of the rated compressor capacity. If the surge limit control valve opens by only 5%, then 10% less of the flow is delivered to the process. This represents an unacceptable operating failure for many processes. On the other hand, in many applications a test of less than 5% of the valve lift does not offer sufficient certainty that the valve will also work safely along a greater stroke region.

The partial stroke test does not rule out the possibility that a valve which has traveled the partial stroke properly without a problem may nevertheless become blocked when departing from this partial stroke. In tests of minimum duration and, therefore, abrupt adjustment of the valve, incipient blockage which expresses itself, for example, in an inhomogeneous movement of the valve in a slow adjustment of the valve cannot be determined.

SUMMARY OF THE INVENTION

Therefore, it is an object of the invention to provide a device and a method which make it possible to conduct reliable tests on process control elements of turbomachines without substantially influencing the processes downstream of the turbomachine.

Turbomachines are often outfitted with more than one process control element, each of which influences the same process variable, e.g., cumulatively, i.e., jointly, or alternately, i.e., independently from one another. In a turbocompressor, the capacity of the compressor is varied by means of a first process control element, e.g., adjustable guide blades. The surge limit control valve, as part of the system for protecting the engine, has the job of keeping the throughput through the compressor large enough so as not to fall below the stability limit when the compressor flow decreases below the stability limit (surge limit) through controlled opening of the surge limit control valve. Conversely, this means that opening the surge limit control valve during stationary compressor operation will result in a reduced flow in the process. To this extent, the adjustable guide blades and the surge limit control valve act alternately in that the throughput can be appreciably altered in the process by each control member. In a steam turbine or turbo expander, a plurality of valves are often installed in parallel and can be operated in a staggered manner for precision speed adjustments. These control members act cumulatively to this extent in that they jointly define the total volume flow to the turbine. During the operation of a plurality of turbomachines in series operation or parallel operation, every turbomachine has at least one control member of its own for capacity matching. The common intake pressure and end pressure of compressors in parallel operation can be influenced cumulatively by each control member for adapting the capacity of every compressor. The same is true for the flow of compressors in series operation in which the control members of the individual turbomachines act alternately, i.e., can each vary the total throughput.

The invention makes use of the fact that the same process variable can be influenced by more than one process control element in order to perform a function test of control elements without the process variable itself undergoing any change.

To test the first process control element, the test system according to the invention changes the process variable by means of the second process control element. This takes place depending on the quiescent position of the first process control element. This means that when, for example, the first process control element is a valve which is closed or partially open during trouble-free operation and reduces the flow through the turbocompressor when open, the flow generated by the turbocompressor is increased by the second process control element, e.g., adjustable guide blades. The change in the process variable is compensated for by the first process control element. In the present example, this means that the valve, as first process control element, is opened to compensate for the change in flow through the valve so that the increased flow generated by the turbomachine is further reduced.

By means of the device according to the invention, actuation of the moving parts of the process control element during the test causes a cleaning particularly of the locations in the process control element where there is only slight play. Even if only a part of the total stroke is traveled while the test is running, substantially longer paths can be traveled in the partial stroke test than was formerly possible in the prior art without compensating for the effects of the test. According to the invention, a method for testing the functionality of a process control element of a turbomachine is also provided.

BRIEF DESCRIPTION OF THE DRAWINGS

The present invention will be described more fully in the following within the framework of concrete embodiment forms of the invention referring to some drawings.

DETAILED DESCRIPTION OF THE PREFERRED EMBODIMENTS

Figure 1:
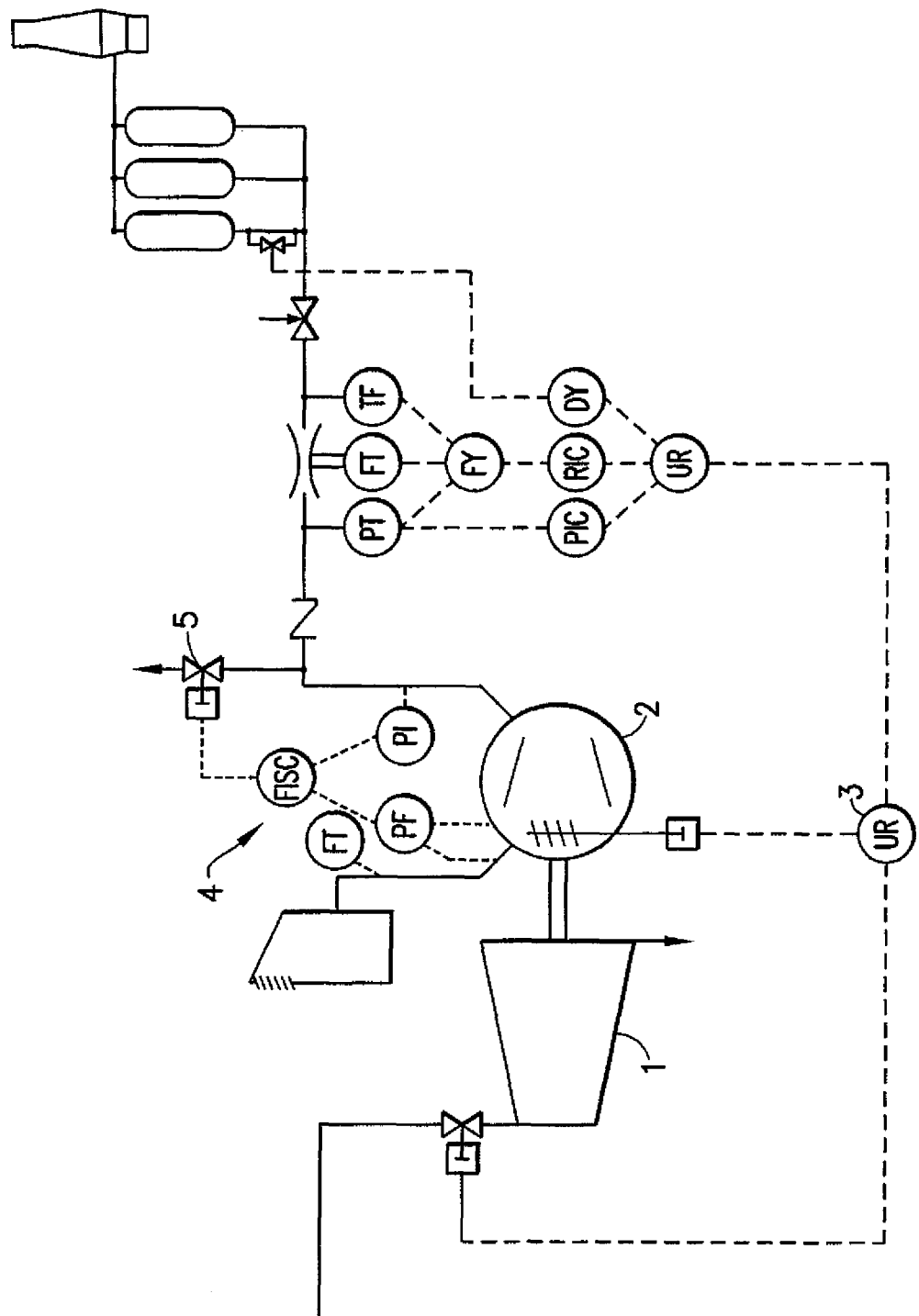
FIG. 1 shows a schematic diagram of a blast furnace installation with a turbocompressor.

FIG. 1 shows an application of the turbocompressor 2 in a blast air supply for a blast furnace. A surge limit control valve 5 is arranged downstream of the turbocompressor 2. The purpose of the surge limit control valve 5 is to protect compressors from operating in the unstable operating range through controlled opening.

As is shown in FIG. 1, the surge limit control valve 5 is a valve that is arranged on the delivery side or pressure side of the turbocompressor 2. The opening of the surge limit control valve 5 causes an increase in the compressor flow and, therefore, operation outside of the surge region. The amount of gas flowing out through the surge limit control valve 5 always means a loss in efficiency. Therefore, installations are generally designed in such a way that surge limit control valves are completely closed in trouble-free operation of the compressor and are opened only during operating disturbances or for starting and stopping.

Therefore, testing the functioning of the surge limit control valve 5 of the turbocompressor in operation means an impairment of the operating behavior of the overall installation because opening the surge limit control valve 5 reduces the flow to the process and consequently also the pressure in the process downstream of the compressor. This is true even when opened only for a short time and/or for a partial stroke.

The turbocompressor 2 is driven by a steam turbine 1. The flow rate of the compressor is adapted by varying the turbine speed or by adjusting the guide blades of the turbocompressor. The surge limit control 4 is known from the prior art and protects the compressor from damage caused by surge.

Figure 2:
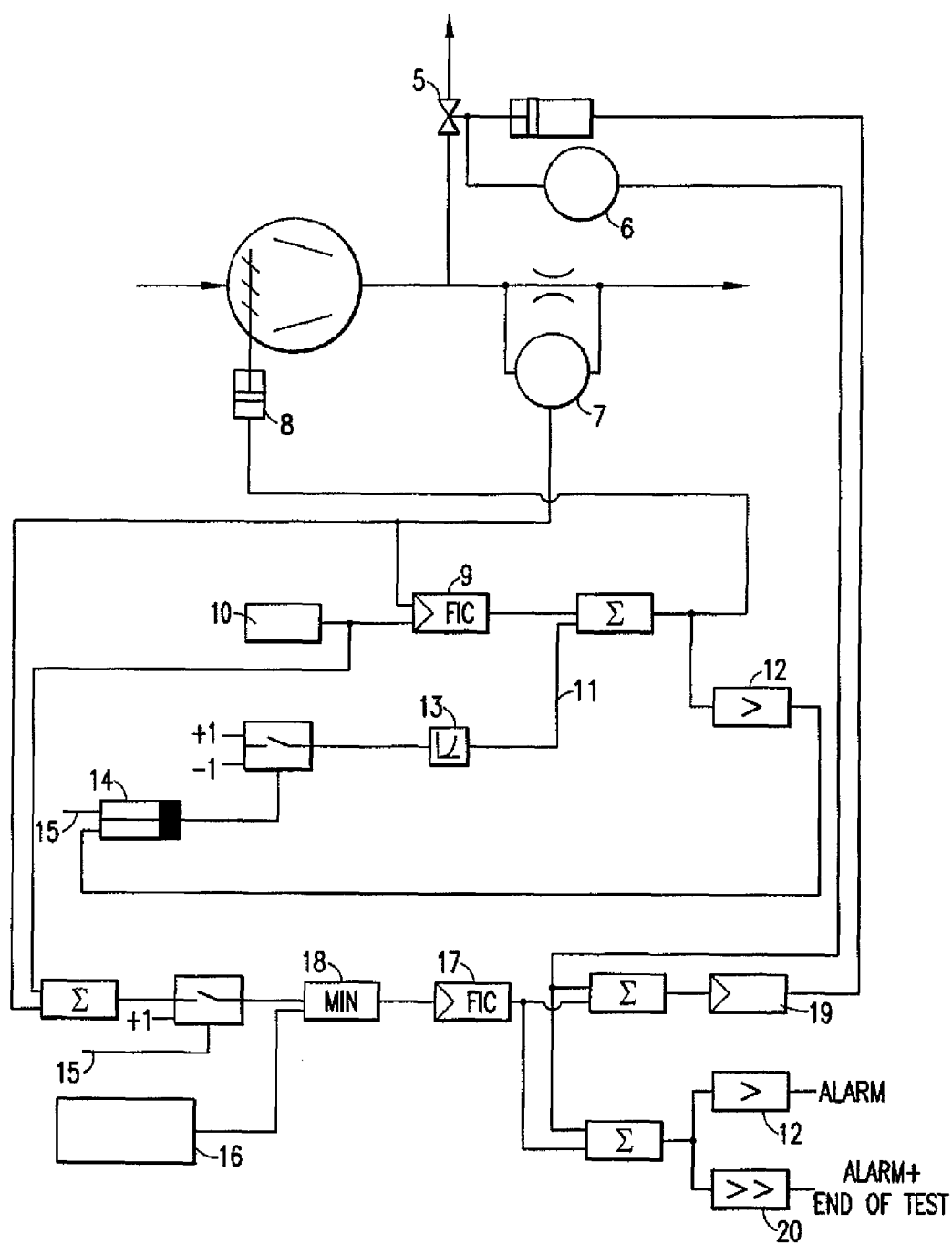
FIG. 2 shows a block diagram of a first embodiment form of a partial stroke test system for surge limit control valves.

FIG. 2 shows a device for performing a partial stroke test on a surge limit control valve 5 of a turbocompressor 2. The partial stroke test system according to the present invention tests the surge limit control valve 5 in such a way that it opens the surge limit control valve to test it and compensates for the reduced flow rate of the compressor by opening the guide blades 8 in direction of a higher compressor output. Apart from this specific construction, a process control element can be any actuator for changing a process variable, e.g., a device for changing speed, a throttle valve, or the like. To compensate for the loss of output in the compressor due to the opening of the surge limit control valve, any process control element can be used that is capable of compensating this loss. In the described application, the process variable to be regulated is the flow that is measured at a suitable point and the guide blades are automatically adjusted to adjust this flow.

The flow conveyed through the compressor is adjusted my means of a flow controller 9 to the value given by a reference value generator for the flow 10. The actuator provided for regulating the flow is preferably the guide blade actuating drive, but can also be a device for changing the speed or a combination of the two. Up to this point in time, the surge limit control valve 5 is still closed or is opened by a fixed amount in operation at partial load.

For the control member function test, the flow controller 9 retains internally its last output quantity. A test signal 15 is generated which is changeable over time by means of an integrator. The difference between the reference flow value from the reference value generator for the flow 10 and the actual flow value from the flow measuring device 7 is switched to the surge limit controller 16, 17, 18 with the position controller arranged downstream for the surge limit control valve 19 which now takes on the task of adjusting the flow to the reference flow value. The output of the flow controller 9 is moved, by additive superposition of the gradually continuously increasing test signal 15, in the direction of guide blades which are opened farther and/or in the direction of higher speed. The flow to the process increases through this increase in the compressor flow rate.

The comparison between reference flow and actual flow in the surge limit controller 17 notices this increase and compensates for it by opening the surge limit control valve by means of the position controller 19.

By comparing the reference value and actual value of the position of the surge limit control valve 5, it can be seen whether or not the valve follows the reference value preset with sufficient accuracy. The output of the summing point behind the flow controller 9 increases continuously until its output has reached an upper limiting value. The signal is then held briefly. The surge limit controller 17 is accordingly given the opportunity to exactly reach the stationary end position. The test signal 15 is then slowly reduced again to zero. When the test signal 15 has reached the value of zero or the surge limit control valve is completely closed, the flow controller is again switched to automatic operation and takes over the further regulation of the installation operation, If the compressor is to be outfitted with a plurality of surge limit control valves, this test can be carried out in such a way that all of the valves are controlled in the same direction, i.e., in parallel. However, the test is preferably carried out in such a way that every valve is tested for itself. This means that when the test for the first valve is concluded a test of the same kind must be performed for the second valve and for each additional valve.

The functioning of the surge limit control valve 5 is checked by comparing the actual position to the reference position. If the valve is sound, the measured position no longer deviates from the reference value as a system-specific discrimination threshold. This can be monitored continuously, for example, in a comparator (threshold monitoring). If the difference exceeds a first limiting value 12, an alarm is triggered. If the difference reaches a second limiting value 20 that is twice as high, for example, a second alarm can be set off as with the first discrimination threshold, the test is immediately terminated and the operating personnel are prompted to carry out an immediate inspection of the valve.

The relationship between the position reference value for one or more surge limit control valves and measured position feedback can be digitally recorded by modern control systems and displayed as a line chart or x/y graph with the reference value as the ordinate and valve position as the abscissa.

Figure 3:
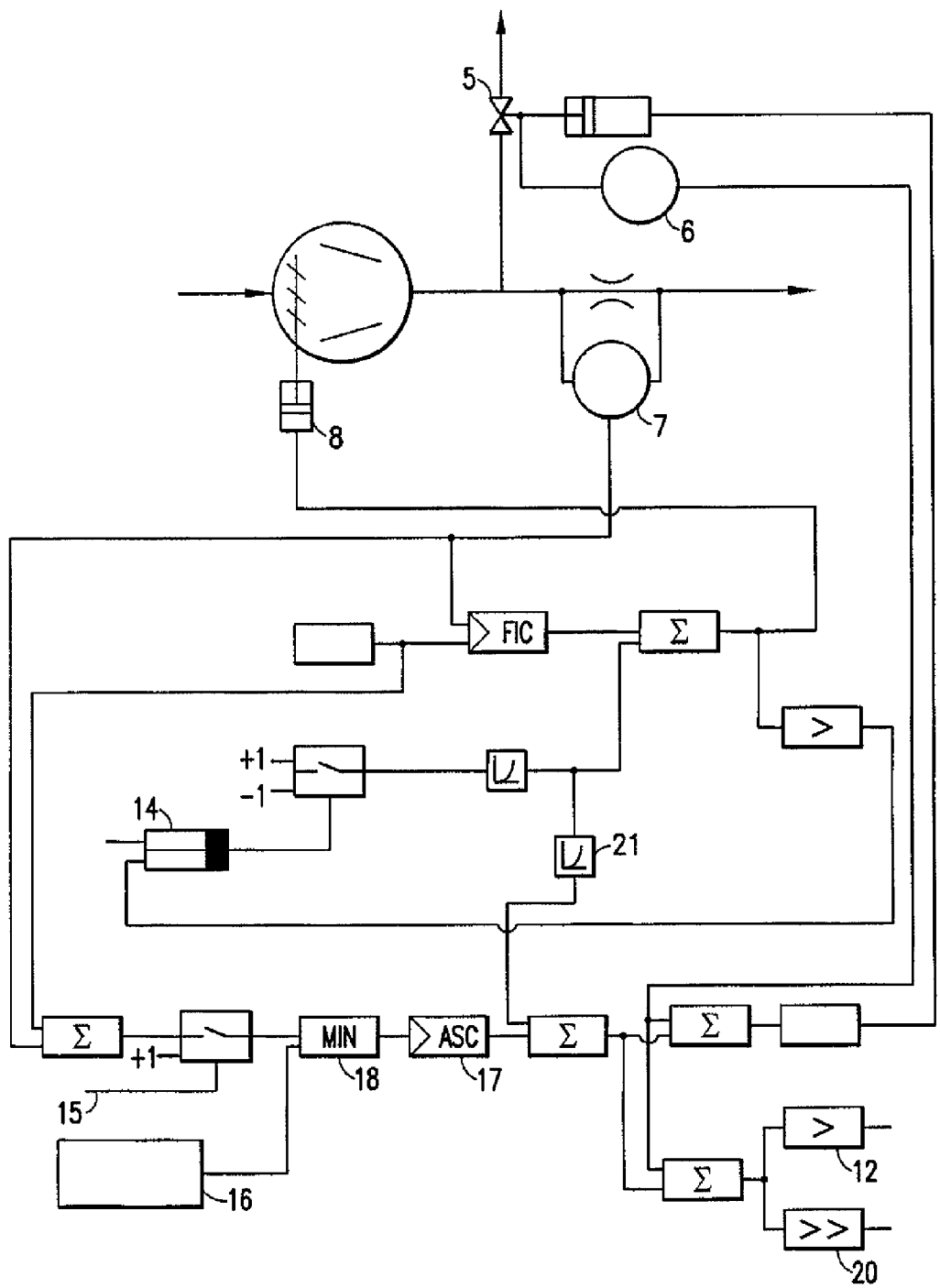
FIG. 3 shows a block diagram of a second embodiment form of a partial stroke test system for surge limit control valves.

According to a second advantageous embodiment form shown in FIG. 3, the present invention provides a device for preventing process disruption through adaptive adjustment of the surge limit control valve. FIG. 3 corresponds substantially to FIG. 2 and is only expanded by a summing unit which is connected to a function generator 21.

The first embodiment form according to FIG. 2 should use a slowly increasing test signal so that the surge limit controller 17 can compensate for the increased flow as a result of the adjustment of speed and/or guide blade position by opening the surge limit control valve 5. An improvement in this embodiment form is possible according to FIG. 3 in that the test signal 15 is additionally switched to the output of the surge limit controller according to its mathematical sign. The surge limit control valve 5 accordingly opens already before the flow actually increases. The response characteristic is improved by this pre-control in which a changing command variable is switched to the surge limit controller regardless of the offset from the summing unit.

The relationship between the speed or guide blade position and the flow through the compressor is generally nonlinear, whereas the relationship between the position of the surge limit control valve and the flow through the valve is linear. It can be ensured through a suitably selected nonlinear function which is adjustable at the function generator 21 that the surge limit control valve 5 is opened precisely far enough—depending on the test signal 5—so that the increase in the compressor flow due to increase in speed and/or opening the guide blades exactly matches the decrease in the flow caused by opening the surge limit control valve 5. Accordingly, the surge limit controller 17 need not act and the partial stroke test proceeds without disadvantageously influencing the process. In cases where the relationship between the position of the surge limit control valve and the flow through this valve is nonlinear, this can also be corrected through a suitable choice of the nonlinear function.

If the compensation of the two manipulated variables is not completely successful, for example, due to incorrect adjustment of the function generator 21 or because of a calibration error, the surge limit controller brings about a correction of the remaining residual error.

Figure 4:
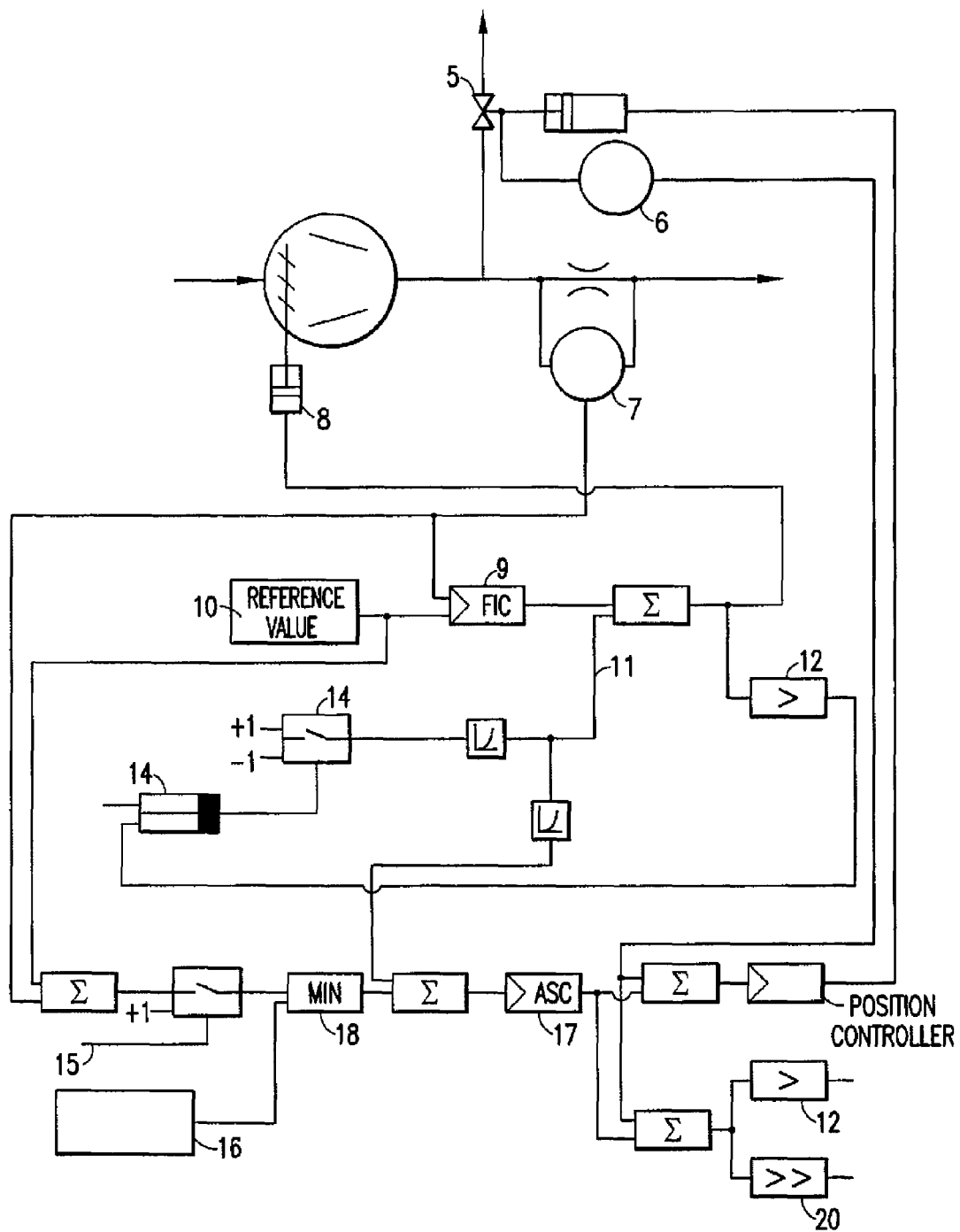
FIG. 4 shows a block diagram of a third embodiment form of a partial stroke test system for surge limit control valves.

According to a third embodiment form of the invention which is shown in FIG. 4, instead of adding the test signal 15 to the output of the surge limit controller 17, the test signal 15 is added to the offset at the input of the surge limit controller 17 in accordance with the mathematical sign. This has the advantage that the output signal of the surge limit controller 17 always agrees with the reference value for the surge limit control valve 5. The surge limit controller 17 is always engaged, so to speak.

Further, the adjusting data for the function generator can be determined from the design data for the compressor 2 and surge limit control valve 5. In particular, the exact correlation of variables in the first test can be determined empirically and the system can subsequently be adjusted to these values.

In another advantageous construction of this invention, the difference of the test signal and the output signal of the surge limit controller is taken at the start of the test and switched to the start of the surge limit controller as a virtual offset of the minimum select MIN. As the test signal increases, the surge limit controller obtains an offset which opens the surge limit control valve precisely far enough as required by the test signal. In case the surge limit control valve was already partially open before the start of the test, this is compensated for in that the position of the surge limit control valve at the start of the test is adopted as a reference value. If the operating point of the compressor shifts during the test in the direction of the surge limit in such a way that the surge limit control valve must be opened farther than determined by the test signal, there is an automatic override of the surge limit controller by the minimum select.

In all of the applications in which the nonlinear relationship between the test signal and flow to the process has a dependence on another parameter, e.g., the compressor pressure, this influence can be compensated by means of a performance diagram or map. The map contains a series of nonlinear compensation curves for various pressures, and the corresponding curve is selected depending on the measured end pressure. If the measured pressure lies between two characteristic lines, an interpolation is carried out between these characteristic lines.

When the adaptive adjustment of the surge limit control valve is set correctly, the test signal can be adjusted as fast as desired because disturbances in the process operation are prevented by decoupling. However, it must be taken into account that the actuating speed of the process control elements may possibly be limited. It must be ensured that the manipulated variables may not be adjusted faster than can be followed by the process control elements.

Figure 5:
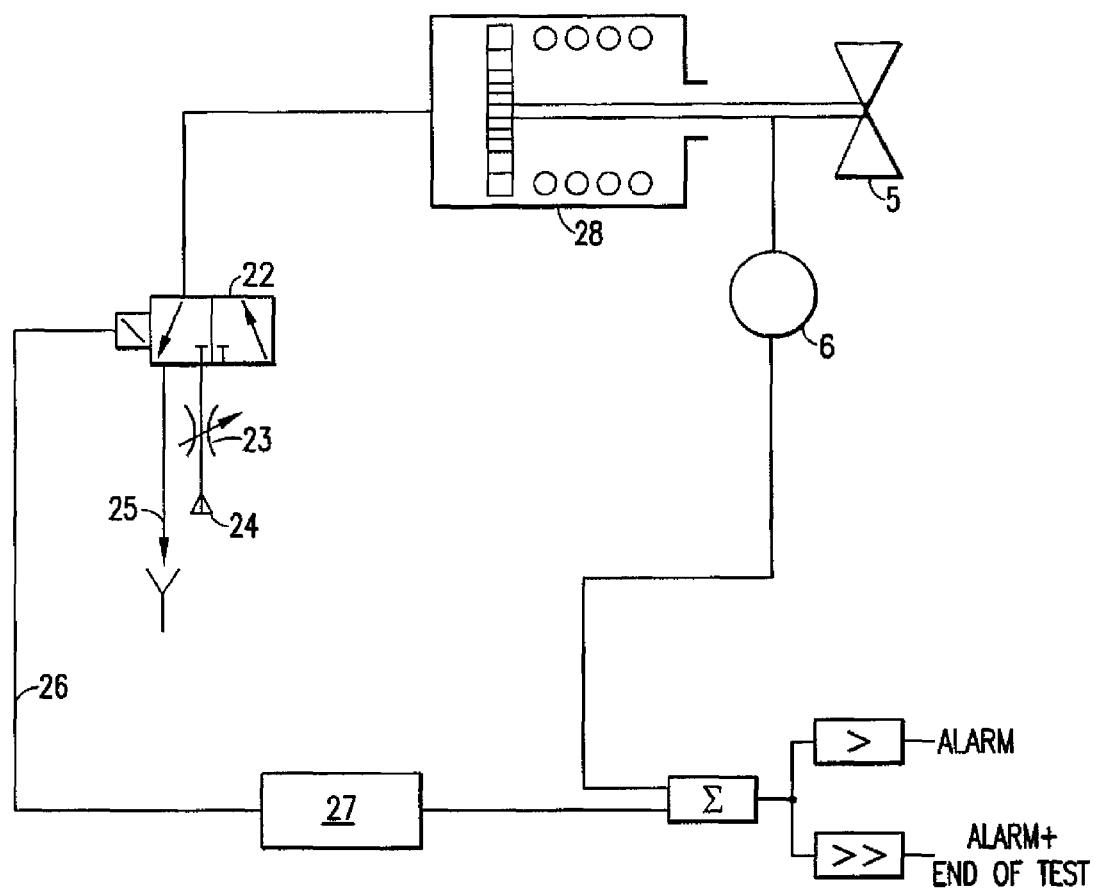
FIG. 5 shows a block diagram of a fourth embodiment form of a partial stroke test system for surge limit control valves.

According to a fourth embodiment form of the invention, as is shown in FIG. 5, an observer or sensor 27 is provided which compensates for the disadvantages of slow process control elements. The process control elements have limited actuating speeds which are partly due to design, partly deliberately implemented. Often, pneumatic control valves can cover no more than 10% of the total lift per second. The closing speed of surge limit control valves and guide blade actuating drives is deliberately limited in order to prevent an impermissibly fast approach of the operating point to the surge limit. This must be taken into account when conducting the partial stroke test because otherwise an alarm can be triggered mistakenly.

When using sensor 27, the measured position of the surge limit control valve is not directly compared to the reference value for the position but rather to the output variable of an observer. A surge limit control valve which opens by spring pressure can close only with limited actuating speed by means of a choke 23 in the intake 24 of an electrohydraulic converter 22. The narrower the cross section of the choke 23, the slower the valve closes.

The sensor 27 is a dynamic simulation model of this surge limit control valve with actuating drive 28. An observer of this kind is described, e.g., in "Ein Beitrag zur digitalen Pumpschutzregelung von Turbokompressoren", Schriftreiche des Lehrstuhls für Regelungssyteme and Steuerungstechnik Ruhr Universitat Bochum, Heft 31.

The output signal of the sensor 27 always corresponds to the position of the surge limit control valve 5 insofar as its function is not impaired. As long as the observer correctly simulates the actual control behavior of the valve and the valve is operating properly, the output of the observer will always correspond to the actual valve position even when there is an abrupt change in the valve reference value and in the event of a very sharply throttled oil intake.

The partial stroke test can be performed manually, semi-automatically or fully automatically. When performed manually, the test signal is given manually by the operator. Observation of the valve feedback is likewise carried out by the operator. In full automation, the test is initiated at regular intervals in time and proceeds fully automatically thereafter. After the last test run for the last valve, the automatic testing system is reset to a starting state and is then ready for the next test. The test results are archived fully automatically also.

According to another construction of the invention, when the influence of the test signal on the process variable cannot be compensated for correctly, this influence can be reduced by varying the speed at which the test value is changed depending on the difference between the reference value and the actual value of the process variable. When the deviation is zero, the test is performed at the maximum permissible or maximum possible speed. The greater the deviation between the reference value and the actual value of the process variable, the slower the process variable is changed. In extreme cases, it is even possible that the test signal can no longer be adjusted or can even be adjusted in the opposite direction until the difference between the reference value and the actual value of the process variable is again acceptable.

Figure 6:
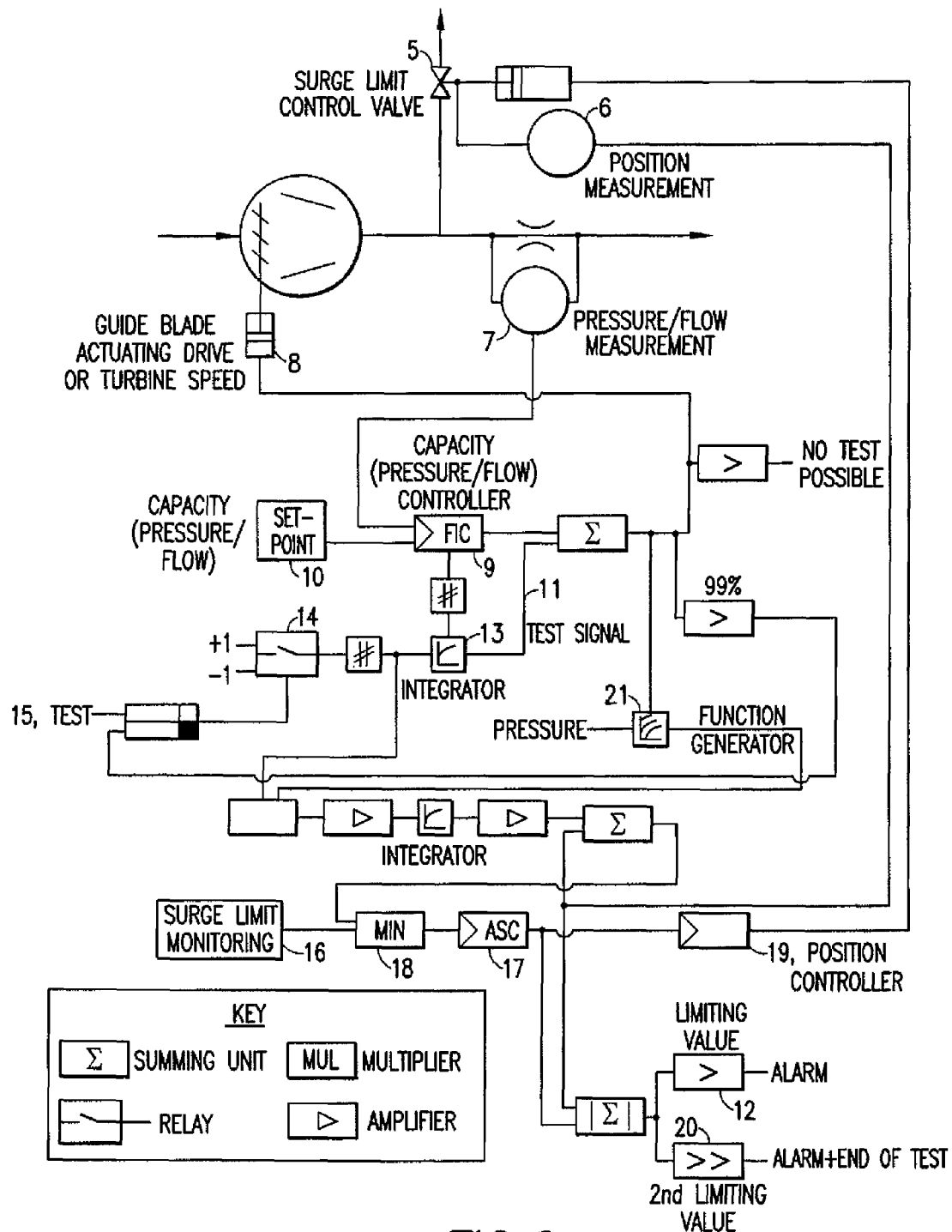
FIG. 6 is a block diagram showing a fifth embodiment form of a partial stroke test system for surge limit control valves.

FIG. 6 is a block diagram showing a fifth embodiment form of a partial stroke test system for surge limit control valves according to the present invention. Elements which are the same as those in the embodiment forms described above have the same reference numbers.

The partial stroke test system according to the fifth embodiment form comprises a surge limit monitoring unit 16 whose output is fed to a surge limit controller 17 via a minimum select 18. Accordingly, a surge can be prevented in the compressor 2 also during the test operation because a corresponding manipulated variable for the surge limit control valve 5 which is given by the surge limit monitoring unit 16 to prevent surge is, if necessary, switched through to the position controller 19 which correspondingly actuates the surge limit control valve 5.

The position of the surge limit control valve 5 detected by the position measuring unit 6 is fed back and subtracted in an adding unit from the reference position given by the surge limit controller 17. If the difference between the reference position and the actual position exceeds a first or second limiting value 12 or 20, an alarm is triggered, and if the second limiting value is exceeded the test is terminated in a controlled manner. By means of this position monitoring, an incipient blockage in the surge limit control valve 5 which manifests itself in an increasing hysteresis in the opening and closing of the valve 5 can be detected in a timely manner.

Before the start of the test, it is first checked whether there are sufficient capacity reserves available. Only in this case is the test carried out. For this purpose, it is checked whether or not the guide blade actuating drive 8 is actuated only to a determined limiting value which corresponds, for example, to 95% of the maximum possible guide blade opening. It is also preferably constantly checked during the test whether there is still sufficient capacity for compensating the outflow through the surge limit control valve 5 which is opened for testing purposes, i.e., the guide blades are not yet adjusted to 95% or more of their maximum flow cross section. As soon as the guide blades open farther and there is accordingly a risk that an even larger outflow though the surge limit control valve 5 can no longer be compensated and will disrupt the process, the test is terminated in a controlled manner.

At the start of the test, the integrator 13 generates a test signal 11 which initially increases over time until a positive, preferably constant, integrand is supplied to the integrator 13 from the storage 14. To end the test, a correspondingly negative integrand supplying a test signal 11 that decreases over time is then fed to the integrator 13. This test signal 11 is switched to the output of the flow controller 9 in a summing unit and, as a result, the guide blade actuating drive 8 obtains a manipulated variable which leads to a greater guide blade opening, i.e., a greater flow, as the test signal 11 increases and to a smaller guide blade opening, i.e., a smaller flow, as the test signal 11 decreases.

In this way, the guide blades can initially be opened in a controlled manner to a greater extent than would be required for adjusting the reference flow value, and subsequently returned to that precise position in which the flow value is reestablished. This can be realized in a simple manner, for example, in that a constant positive integrand is fed to the integrator 13 during the first half of the test operation and a negative integrand of the same amount is fed to the integrator 13 during the second half of the test operation. Also, to terminate the test in a controlled manner, a negative integrand of the same amount can simply be supplied to the integrator 13 for the time elapsed since the start of the test. In a preferred modification, the integrand can also be reciprocal in amount to the deviation between the reference value and the actual value of the flow controller so that the test signal 11 changes more slowly with greater differences between the reference value and actual value and gives the flow controller the opportunity to compensate for the disturbance.

Depending on the position of the operating point of the compressor 2 on the compressor map, compensation for a determined guide blade opening requires the surge limit control valve to be opened differently due to the nonlinearity in the process. For this purpose, a compensation function which can be determined computationally and empirically is provided in the test system according to the fifth embodiment form of the present invention. For this purpose, the end pressure volume flow in the compressor map, for example, can be divided into regions extending between two different pressures (e.g., between 2 bar and 3 bar, between 3 bar and 4 bar, etc.) and two different guide blade positions (e.g., between 10% open and 20% open, between 10% open and 20% open, etc.) It can then be determined for each of these pressures defining the regions how the flow changes when the guide blade position changes from one to the other of the two guide blade positions defining the region, that is, for example, how much the flow increases when the guide blades are increased from 10% to 20% at 2 bar. A valve adjustment can then be determined from the design curve of the surge limit control valve 5 and correlated with the respective pairs of parameters (pressure; change in guide blade position) which precisely compensate for the change in flow.

In the function generator 21, the corresponding change in position of the surge limit control valve is now associated with the pressure p, for example, 2 bar, that is actually generated by the compressor 2 and with the manipulated variable given to the guide blade actuating drive 8, for example, a change from 10% open to 20% open, based on this compensation function, i.e., that valve adjustment that precisely compensates for the change in flow due to the guide blade adjustment that has just been carried out.

This valve adjustment is then added to the actual position of the surge limit control valve 5 and supplied to the surge limit controller 17 as a new reference value. Insofar as the minimum select discussed above does not switch through the output of the overriding surge limit monitoring unit 16 in order to prevent a surge in the compressor 2, the surge limit controller 17 changes the position of the surge limit control valve 5 via the position controller 19 in such a way that precisely the adjustment of the guide blades that is carried out is compensated at the actually prevailing pressure.

By adding the valve adjustment resulting from the compensation function to the actual position, the nonlinearities of the process can be taken into account on the one hand and, on the other hand, the test can also be initiated when the surge limit control valve is not fully closed at first.

Instead of the end pressure after the compressor, the compensation function can also be based on its pressure ratio or enthalpy difference.

In the embodiment forms described above, the installation to be tested already has means for regulating capacity in which the flow is detected by a flow measuring device 7, supplied to the flow controller 9, and used by the flow controller 9 to update a reference flow given by the reference value generator 10. In installations in which there is no capacity regulation of this kind, a disruption in the process operation, e.g., incomplete compensation function, can advantageously be compensated or at least reduced by means of an auxiliary capacity controller which only operates during the test.

For this purpose, in another construction of the present invention, the actual pressure value after the compressor 2 is detected and stored at the start of a test. This pressure value is now supplied as a reference pressure value during the test to an auxiliary capacity controller or flow controller which can be constructed, for example, as a proportional-integral (PI) controller. The auxiliary capacity controller forms a manipulated variable for the second process control element, e.g., the guide blade drive or speed control, from the difference between the reference pressure and the actual pressure value. This manipulated variable is added to the manipulated variable which is switched to the second process control element for testing purposes, that is, for example, causes a trapezoidal opening and closing of the guide blades.

Accordingly, on the one hand, the second process control element is deliberately adjusted during the test to compensate for an adjustment of the first process control element, e.g., the surge limit control valve, for testing purposes. On the other hand, it is ensured that at least substantially the same process variable, e.g., the pressure, prevailing at the start of the test, that is, in normal operation, also prevails in the continued process. In this way, inaccuracies, particularly those occurring, e.g., when determining the compensation function mentioned above, or other disturbances can be substantially compensated.

At the end of the test, the reference value of the auxiliary capacity controller is updated to the actually prevailing pressure so that the offset is zero, i.e., the output of the auxiliary capacity controller also returns to zero. For this purpose, the output of the auxiliary capacity controller, which can be attenuated by a limiter, is switched on as an offset with the opposite mathematical sign, for example, by means of a relay.

The invention was described above with reference to preferred embodiment forms. Of course, modifications are also possible. In particular, individual elements of the various embodiment forms can be combined and/or omitted in individual embodiment forms.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for testing the functionality of a process control element of a turbomachine, the turbomachine comprising a first process control element configured as a surge valve to control a process variable, a second process control element configured as a guide blade actuating drive to control the process variable, and a test system for testing the first process control element, the method comprising:
    actuating the second process control element to change the process variable to test the first process control element, wherein the second process control element is at least one of a device for adjusting guide blades of the turbocompressor, a device for changing the speed of the turbocompressor, and an outlet guide vane for the turbocompressor;
    actuating the first process control element; and
    adjusting the second process control element to compensate the process variable,
    wherein the first process control element and the second process control element control different variables that affect the process variable.

2. The method according to claim 1, wherein test signals switched to the first process control element and the second process control element are configured in a varied manner by a nonlinear function element wherein the process variable is changed only slightly or not at all.

3. The method according to claim 2, wherein the test signals switched to the first and the second process control element are adjusted so as to be adapted to one another by a nonlinear relationship such that a characteristic line is selected for adapting the test signals to one another depending on at least one of the process variable be maintained constant and another process variable,
    wherein interpolation is carried out between two characteristic lines when the process variable is situated between the two characteristic lines.

4. The method according to claim 3, wherein the process variable which is to be maintained constant or the other process variable comprises at least one of a final pressure, a pressure ratio, and an enthalpy difference of the turbomachine.

5. The method according to claim 1, further comprising:
    adjusting the first process control element and the second process control element in opposite directions; and
    adding a test signal, according to mathematical sign, to output variables of a preceding controller,
    wherein the adjustment of the two process control elements is carried out by a nonlinear amplifier element, the process variable being changed only slightly or not at all.

6. The method according to claim 5, wherein a gradient for a change in the test signal is based at least in part on a deviation of the process variable from a reference value wherein a greater the deviation, a less the test variable changes.

7. The method according to one of claim 1, further comprising determining by a comparison of the reference value and actual value for a position of one or both of the process control elements whether or not the process control elements correctly follow the reference values; and triggering an alarm when a deviation of the reference value and actual value for a position of one or both of the process control elements occurs.

8. The method according to claim 7, wherein the test is terminated when there is a deviation between the reference value and the actual value that exceeds a limiting value.

9. The method according to claim 1, further comprising:

activating a process variable control preceding the first process control element to compensate for a change in the process variable due to the adjustment of the second process control element, wherein the test of the first process control element is carried out in such a way that the second process control element is subjected to a continuous adjustment.

10. The method according to claim 1, further comprising:

forming, by a controller preceding the first process control element, an additional offset from the output variable of the controller at a start of the test and the constantly changeable test signal, wherein the offset is switched to a minimum that obtains, as a second input, an offset of a final controlled variable of this loop, and the test signal for the first process control element is changed only slightly or not at all.

11. The method according to claim 1, wherein an observer is interposed, which simulates dynamic behavior of at least one of the first process control element and the second process control element such that the output of the observer corresponds to an expected control behavior of the at least one of the first process control element and the second process control element.

12. The method according to claim 1, wherein a plurality of process control elements are installed in parallel and are tested, the method further comprising conducting the test such that all of said plural process control elements are controlled at least one of simultaneously and in the same direction.

13. The method according to claim 1, wherein a plurality of process control elements are installed in parallel and are tested, such that only a partial quantity of said plural process control elements are tested, one partial quantity after the other.

14. A turbomachine comprising:

a first process control element configured as a surge limit control valve configured to control a process variable by varying a first variable; and a second process control element configured to control the process variable by varying a second variable, wherein the second process control element is at least one of a device for adjusting guide blades of the turbocompressor, a device for changing the speed of the turbocompressor, and an outlet guide vane for the turbocompressor; and a test system for testing the first process control element configured to adjust the two process control elements such that when the first process control element is adjusted the second process control element is adjusted to compensate for changes induced by the adjustments to the first process control element, wherein influences of the adjustment on the process variable are substantially eliminated and wherein the first variable and the second variable are different.

15. The turbomachine according to claim 14, wherein the turbomachine is a turbocompressor.

16. The turbomachine according to claim 15, wherein the process variable is at least one of a flow through the turbocompressor, an end pressure of the turbocompressor, an intake pressure, and an output of the turbocompressor.

17. The turbomachine according to claim 16, wherein a change in the flow configured to adjust the guide blades is a continuous flow increase which is reduced to an output value after reaching a maximum value.

18. The turbomachine according to claim 14, further comprising a controller configured to control the process variable to compensate for a change in the process variable based at least in part on an adjustment of the second process control element by adjusting the first process control element.

19. The turbomachine according to claim 18, wherein the adjustment is a continuous adjustment.

20. The turbomachine according to claim 14, wherein the opposite adjustment of the first and the second process control elements is balanced such that a test process occurs without substantial impairment of a downstream process of the turbomachine.

21. The turbomachine according to claim 14, wherein the test system is a partial stroke system.

22. The turbomachine according to claim 14, wherein the test system further comprises an auxiliary capacity controller whose output is additively superimposed on the control signal for at least one of the first and the second process control elements, wherein a reference value during a test corresponds to the process variable at a start of the test, whose manipulated variable is reset to zero at an end of the test.

* * * * *